(12) United States Patent
Taruki et al.

(10) Patent No.: US 10,708,527 B2
(45) Date of Patent: Jul. 7, 2020

(54) IMAGING PROCESSING METHOD AND IMAGING PROCESSING DEVICE

(71) Applicant: FUJITSU LIMITED, Kawasaki-shi, Kanagawa (JP)

(72) Inventors: Hirotaka Taruki, Kawasaki (JP); Toshimasa Morinishi, Yokohama (JP); Ryuhei Fujita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/203,556

(22) Filed: Nov. 28, 2018

(65) Prior Publication Data

US 2019/0174082 A1 Jun. 6, 2019

(30) Foreign Application Priority Data

Dec. 4, 2017 (JP) ................................. 2017-232378

(51) Int. Cl.
*H04N 5/365* (2011.01)
*G06K 9/00* (2006.01)
*G06T 7/73* (2017.01)
*H04N 5/232* (2006.01)
*G06T 19/00* (2011.01)
*G06K 9/40* (2006.01)
(Continued)

(52) U.S. Cl.
CPC ....... *H04N 5/3651* (2013.01); *G06K 9/00671* (2013.01); *G06K 9/40* (2013.01); *G06T 7/001* (2013.01); *G06T 7/74* (2017.01); *G06T 19/006* (2013.01); *H04N 5/23218* (2018.08); *H04N 5/23222* (2013.01); *H04N 5/232939* (2018.08); *H04N 5/341* (2013.01); *G06T 2215/16* (2013.01)

(58) Field of Classification Search
None
See application file for complete search history.

(56) References Cited

U.S. PATENT DOCUMENTS

| 2014/0072201 | A1* | 3/2014 | Tilt .................... H04N 5/23293 382/140 |
| 2015/0116314 | A1 | 4/2015 | Saito et al. |
| 2017/0228934 | A1 | 8/2017 | Koga |

(Continued)

FOREIGN PATENT DOCUMENTS

| CN | 105827981 | 8/2016 |
| JP | 2005-341543 | 12/2005 |

(Continued)

OTHER PUBLICATIONS

EESR—Partial European Search Report dated Apr. 9, 2019 in a counterpart European Patent Application No. 18208259.4.

(Continued)

*Primary Examiner* — James M Hannett
(74) *Attorney, Agent, or Firm* — Fujitsu Patent Center

(57) ABSTRACT

Provided is a non-transitory computer-readable storage medium storing an imaging processing program that causes a computer to execute a process, the process including: detecting an inclination of a terminal that is in an imaging mode; and issuing a notice or capturing a still image when detecting that the inclination of the terminal is within a predetermined inclination range and a number of pixels corresponding to a reference subject contained in a captured image is within a predetermined range.

13 Claims, 14 Drawing Sheets

(51) Int. Cl.
*G06T 7/00* (2017.01)
*H04N 5/341* (2011.01)

(56) References Cited

U.S. PATENT DOCUMENTS

2017/0315693 A1   11/2017   Demuth et al.
2018/0180459 A1   6/2018    Takahashi

FOREIGN PATENT DOCUMENTS

| JP | 2012-164254    | 8/2012 |
| JP | 2017-143387    | 8/2017 |
| WO | 2013/106290 A1 | 7/2013 |

OTHER PUBLICATIONS

EESR—Extended European Search Report dated Nov. 21, 2019 in a counterpart European Patent Application No. 18208259.4. ** Remaining references cited in the EESR were previously submitted in the IDS filed on Apr. 18, 2019.

* cited by examiner

400 PIXELS

EXAMPLE OF NOTICE

300 PIXELS

EXAMPLE OF NOTICE

IMAGING PROCESSING METHOD AND IMAGING PROCESSING DEVICE

CROSS-REFERENCE TO RELATED APPLICATION

This application is based upon and claims the benefit of priority of the prior Japanese Patent Application No. 2017-232378 filed on Dec. 4, 2017, the entire contents of which are incorporated herein by reference.

FIELD

A certain aspect of the embodiments described herein relates to a non-transitory computer-readable storage medium, an imaging processing method, and an imaging processing device.

BACKGROUND

Augmented Reality (AR) technology has been known. For example, when a reference subject such as an AR marker is contained in an image captured by a camera of a smartphone, the display of the smartphone displays virtual AR contents associated with the AR marker superimposed on the captured image. This enables to display the captured image with various information added (see, for example, Japanese Laid-open Patent Publication No. 2017-143387).

SUMMARY

According to an aspect of the embodiments, there is provided a non-transitory computer-readable storage medium storing an imaging processing program that causes a computer to execute a process, the process including: detecting an inclination of a terminal that is in an imaging mode; and issuing a notice or capturing a still image when detecting that the inclination of the terminal is within a predetermined inclination range and a number of pixels corresponding to a reference subject contained in a captured image is within a predetermined range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When the attitude of the smartphone is inclined at the time of capturing the image of the above-described AR marker by the camera, the peripheral portion of the captured image displayed on the display together with the AR contents may be distorted compared with the peripheral portion of the image captured when the attitude of the smartphone is in an upright position and the image of the AR marker is captured from the front. One of the reasons is the non-linearity of the curved surface of the lens used in the camera. More specifically, the non-linearity in the center portion of the lens is small, but the non-linearity increases at closer distances to the edge of the lens. Thus, a captured image of which the peripheral portion is elongated is displayed.

For example, when an image representing a hypothetical gaging board for measuring the water level of a river (hereinafter, referred to as a virtual gaging board) is displayed as AR contents on the display, the following problems may arise. That is, a virtual gaging board is marked with scale marks under the assumption that the peripheral portion of the captured image is not distorted. Thus, when the captured image of which the peripheral portion is distorted is displayed, a correct water level is not obtained by the measurement with the scale marks of the virtual gaging board, and measurement error may thus occur.

Hereinafter, modes for carrying out the present case will be described with reference to the accompanying drawings.

First Embodiment

Figure 1:
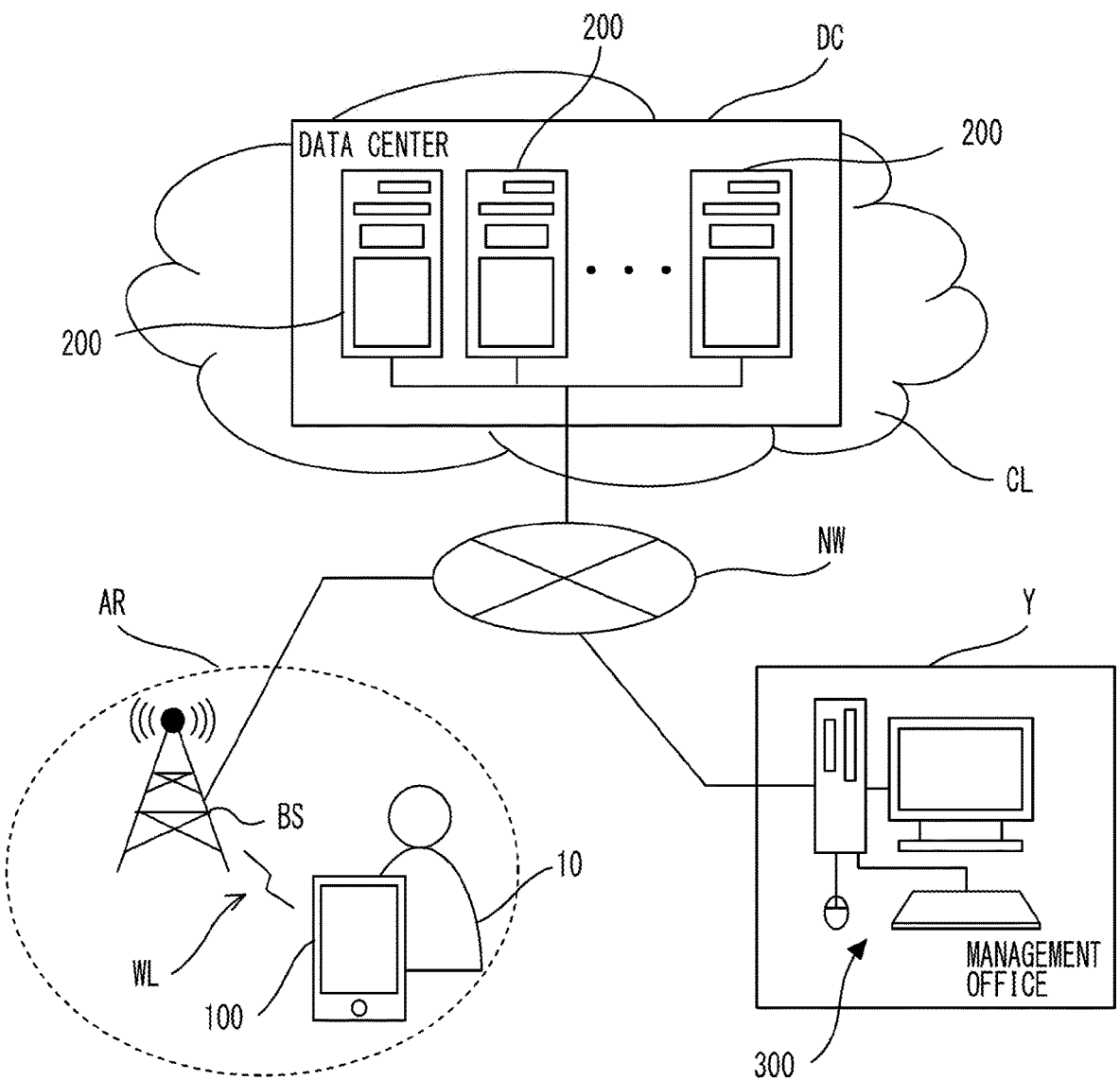
FIG. 1 illustrates a management system.
Figure 2:
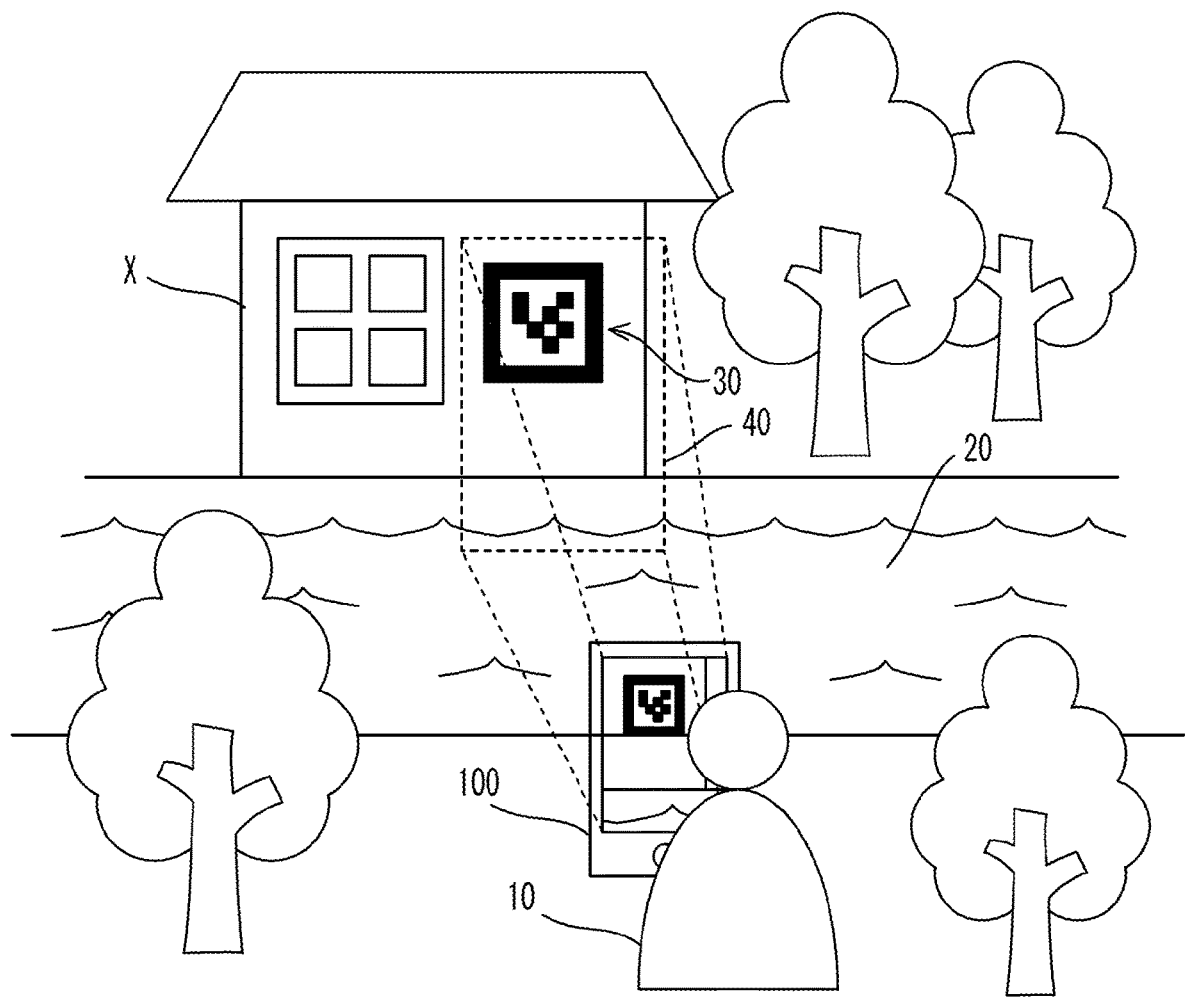
FIG. 2 is a diagram for describing an example in which the water level of a river is measured with an observation terminal.

FIG. 1 illustrates an exemplary management system S. FIG. 2 is a diagram for describing an example in which the water level of a river 20 is measured with use of an observation terminal 100. The management system S is a computer system that manages the water level of a river. The management system S includes the observation terminal 100 as an imaging processing device, management servers 200, and a management terminal 300. The observation terminal 100, the management servers 200, and the management terminal 300 are interconnected via a communication network NW. In particular, the observation terminal 100 is coupled to the management servers 200 via a portable base station BS and the communication network NW. Thus, when the observation terminal 100 is included in a communication-available region AR of the portable base station BS, the observation terminal 100 can communicate with the portable base station BS by wireless communication WL. Accordingly, the observation terminal 100 can communicate with the management server 200. Examples of the communication network NW include, but are not limited to, the Internet.

Examples of the wireless communication WL include, but are not limited to, wide-area wireless communication, or near field communication.

The observation terminal 100 is a terminal device used by an observer 10 who observes the water level of a river. FIG. 1 illustrates a smartphone as an example of the observation terminal 100, but the observation terminal 100 may be, for example, a tablet terminal or a wearable terminal. As illustrated in FIG. 2, the observer 10 uses the observation terminal 100 to capture the image of an AR marker 30 installed in an observation site X (e.g., a residential building) from a location that is apart from the river 20 and is as safe as possible. The observation site X is located at the other side of the river 20 from the observer 10. When the observer 10 captures the image of the AR marker 30, an imaging region 40 of the observation terminal 100 is required to contain both the AR marker 30 and the water surface of the river 20.

Although details will be described later, when capturing the image of the AR marker 30, the observation terminal 100 displays the virtual gaging board superimposed on the captured image. When the observer 10 conducts a particular operation such as tapping the water surface of the river 20 contained in the captured image, the observation terminal 100 transmits, to the management server 200, river information including the water level indicated by the water surface and the still image obtained based on the captured image. The observer 10 takes the image of the AR marker 30 two to three times per day.

The management server 200 is installed in a data center DC on a cloud CL. The management server 200 receives the river information transmitted from the observation terminal 100, and stores the received river information. In addition, the management server 200 stores an application program for managing the river information (hereinafter, referred to as a river management application). For example, the river management application includes a process of showing change in water level of the river 20 graphically based on the river information, and outputting warning information when the water level reaches the warning water level of flood.

The management terminal 300 is installed in a management office Y of a local government managing the river 20, and is operated by a staff person of the management office Y. FIG. 1 illustrates a personal computer (PC) as an example of the management terminal 300, but the management terminal 300 may be a smart device such as a smartphone or a tablet terminal. When the management terminal 300 accesses the management server 200, the management server 200 activates the river management application, and transmits screen information including a graph representing the change in water level of the river 20. When the management terminal 300 receives the screen information, the management terminal 300 displays a screen according to the screen information. Accordingly, the staff person of the management office Y can check the change in water level of the river 20, and can call on citizens to evacuate by issuing alerts when the flood of the river 20 is expected.

Hereinafter, the details of the observation terminal 100 will be described.

Figure 3:
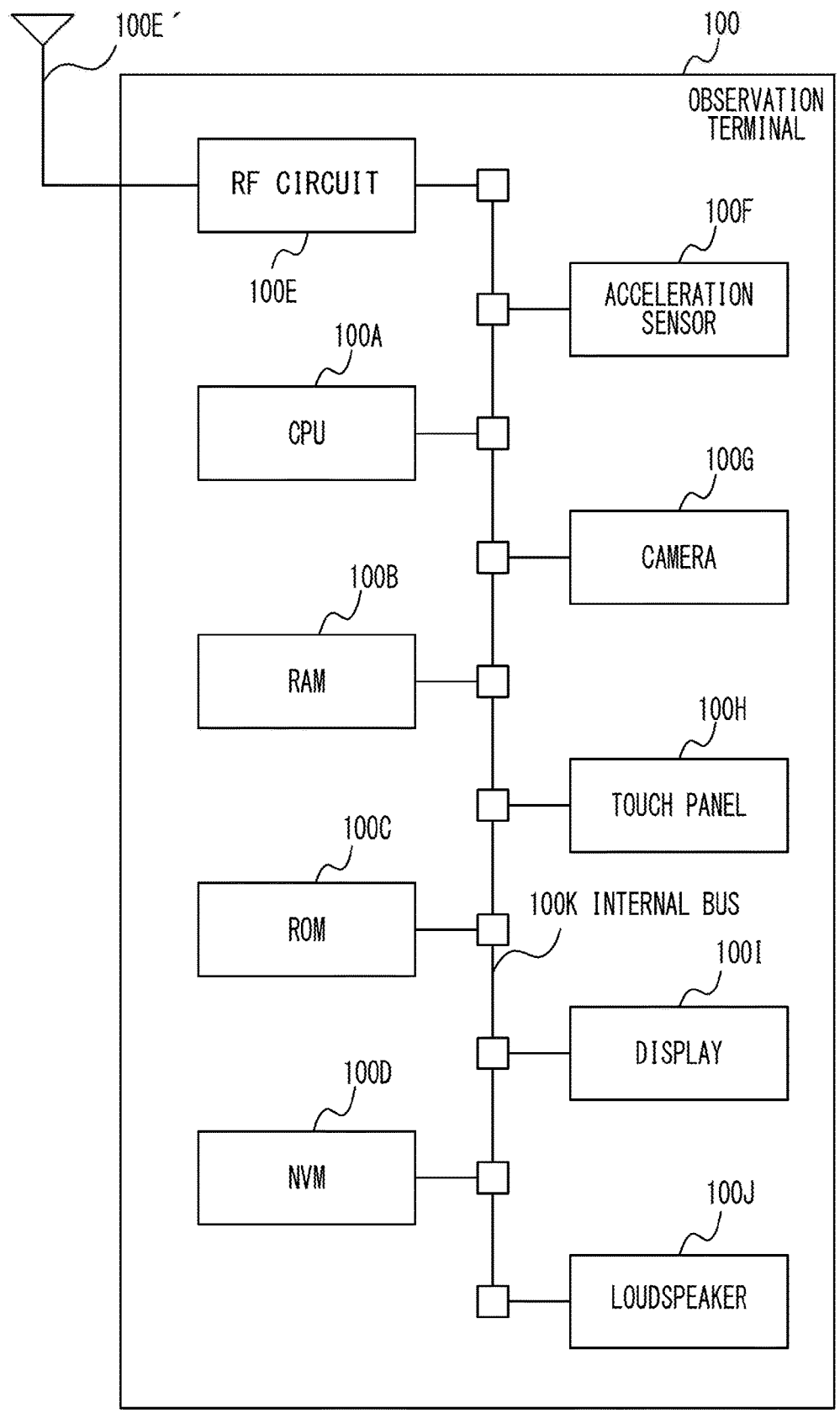
FIG. 3 illustrates a hardware configuration of the observation terminal.

FIG. 3 illustrates a hardware configuration of the observation terminal 100. As illustrated in FIG. 3, the observation terminal 100 includes a Central Processing Unit (CPU) 100A as a hardware processor, a Random Access Memory (RAM) 100B, a Read Only Memory (ROM) 100C, a Non-Volatile Memory (NVM) 100D, and a Radio Frequency (RF) circuit 100E. An antenna 100E' is coupled to the RF circuit 100E. Instead of the RF circuit 100E, a CPU (not illustrated) implementing a communication function may be used.

The observation terminal 100 includes an acceleration sensor 100F, a camera 100G, a touch panel 100H, a display 100I, and a loudspeaker 100J. In particular, the camera 100G includes an image sensor such as a Complementary Metal Oxide Semiconductor (CMOS) or a Charge Coupled Device (CCD) and a non-linear lens of which the curvature is not constant. The CPU 100A through the loudspeaker 100J are interconnected by an internal bus 100K. At least cooperation of the CPU 100A and the RAM 100B achieves the computer. Instead of the CPU 100A, a Micro Processing Unit (MPU) may be used as a hardware processor.

The CPU 100A stores, in the above-described RAM 100B, programs stored in the ROM 100C or the NVM 100D. The execution of the stored program by the CPU 100A causes the CPU 100A to implement various functions described later, and execute various processes described later. It is sufficient if the program is written according to flowcharts described later.

Figure 4:
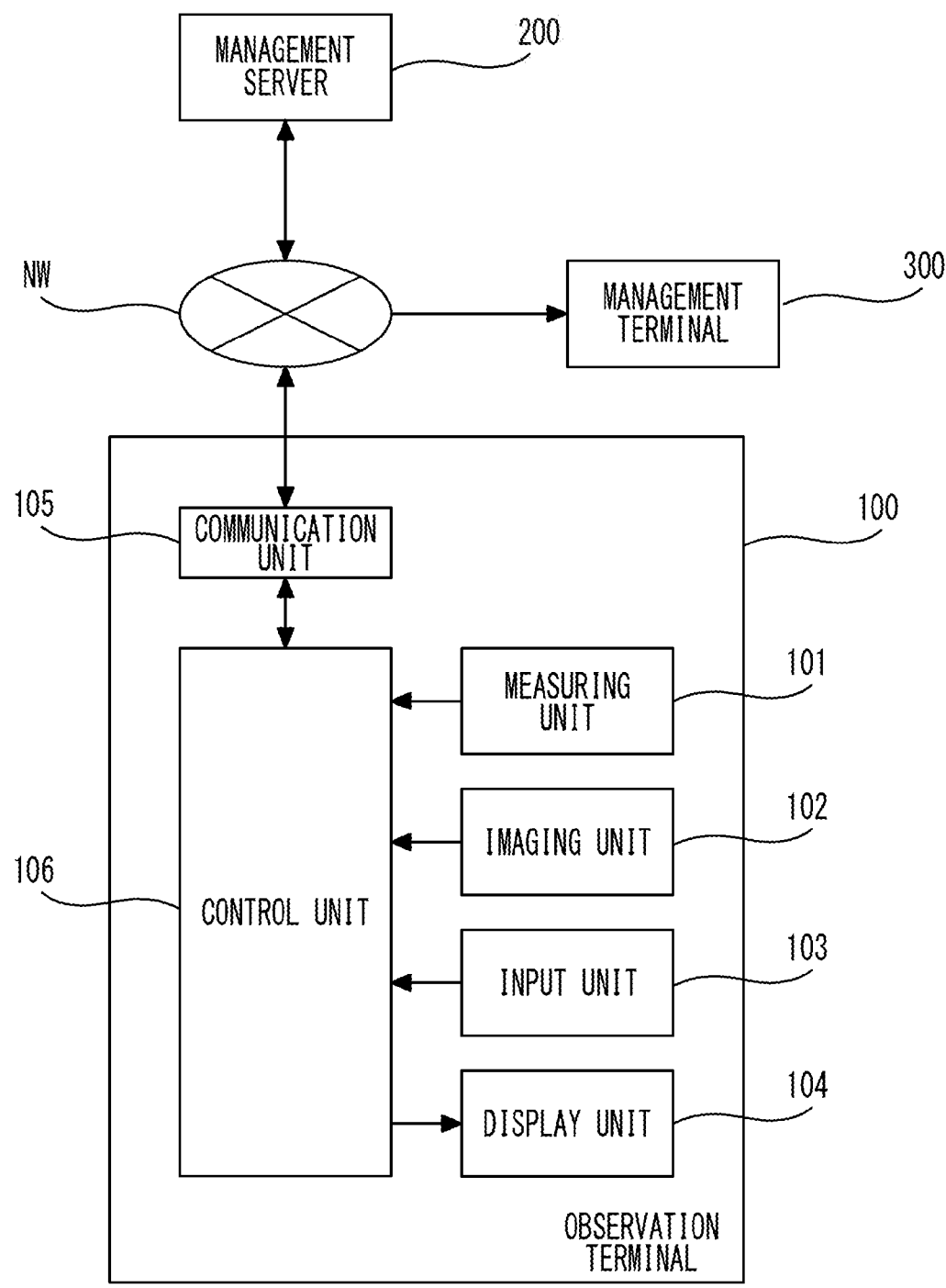
FIG. 4 is an exemplary block diagram of the observation terminal.

FIG. 4 is an exemplary block diagram of the observation terminal 100. In particular, FIG. 4 illustrates main part of functions achieved by the observation terminal 100. The observation terminal 100 includes a measuring unit 101, an imaging unit 102, an input unit 103, a display unit 104, a communication unit 105, and a control unit 106. The measuring unit 101 is implemented by, for example, the aforementioned acceleration sensor 100F. The imaging unit 102 is implemented by, for example, the aforementioned camera 100G. The input unit 103 is implemented by, for example, the aforementioned touch panel 100H. The display unit 104 is implemented by, for example, the aforementioned display 100I. The communication unit 105 is implemented by, for example, the aforementioned RF circuit 100E and the antenna 100E'. The control unit 106 is implemented by, for example, the aforementioned CPU 100A. In FIG. 4, the illustration of a storage unit is omitted, but the storage unit can be implemented by, for example, the aforementioned RAM 100B or the NVM 100D.

The measuring unit 101 measures a gravitational acceleration, and outputs the measured gravitational acceleration to the control unit 106. The imaging unit 102 captures an image in the imaging region 40, generates the captured image representing the image corresponding to the imaging region 40, and continuously outputs the captured image to the control unit 106. Thus, when the AR marker 30 is contained in the imaging region 40, the imaging unit 102 outputs, to the control unit 106, the captured image containing the AR marker 30.

The input unit 103 receives an input corresponding to the operation conducted by the observer 10 in the observation terminal 100, and outputs the received input to the control unit 106. For example, when the observer 10 conducts an operation to activate the camera on a screen displayed on the observation terminal 100, the input unit 103 receives the input corresponding to this operation, and outputs the received input to the control unit 106. For example, when the observer 10 conducts an operation to determine the position of the water level of the river 20 in the captured image displayed on the observation terminal 100, the input unit 103 receives the input corresponding to this operation, and outputs the received input to the control unit 106. The display unit 104 displays the captured image output from the control unit 106. In particular, when the captured image contains the AR marker 30, the display unit 104 displays the virtual gaging board superimposed on the captured image.

The communication unit 105 controls communication between the observation terminal 100 and the management server 200. For example, the communication unit 105 attempts to access the management server 200 based on the control by the control unit 106, and when succeeding in the access, transmits, to the management server 200, the river information including the water level of the river 20 and the still image obtained based on the captured image.

The control unit 106 controls the overall operations of the observation terminal 100. For example, when receiving the gravitational acceleration output from the measuring unit 101, the control unit 106 detects the inclination of the attitude of the observation terminal 100 based on the received gravitational acceleration. For example, when receiving a captured image output from the imaging unit 102, the control unit 106 outputs the received captured image to the display unit 104. In particular, when detecting that the captured image contains the AR marker 30, the control unit 106 recognizes the AR marker 30, and outputs the virtual gaging board associated with the AR marker 30 to the display unit 104. For example, when receiving the input output from the input unit 103, the control unit 106 distinguishes the type of the input, and generates a still image from the captured image or measures the water level of the river 20 based on the determination result. Besides, the control unit 106 executes other various processes, but the details of each process will be described later.

Next, the operation of the observation terminal 100 will be described.

Figure 5:
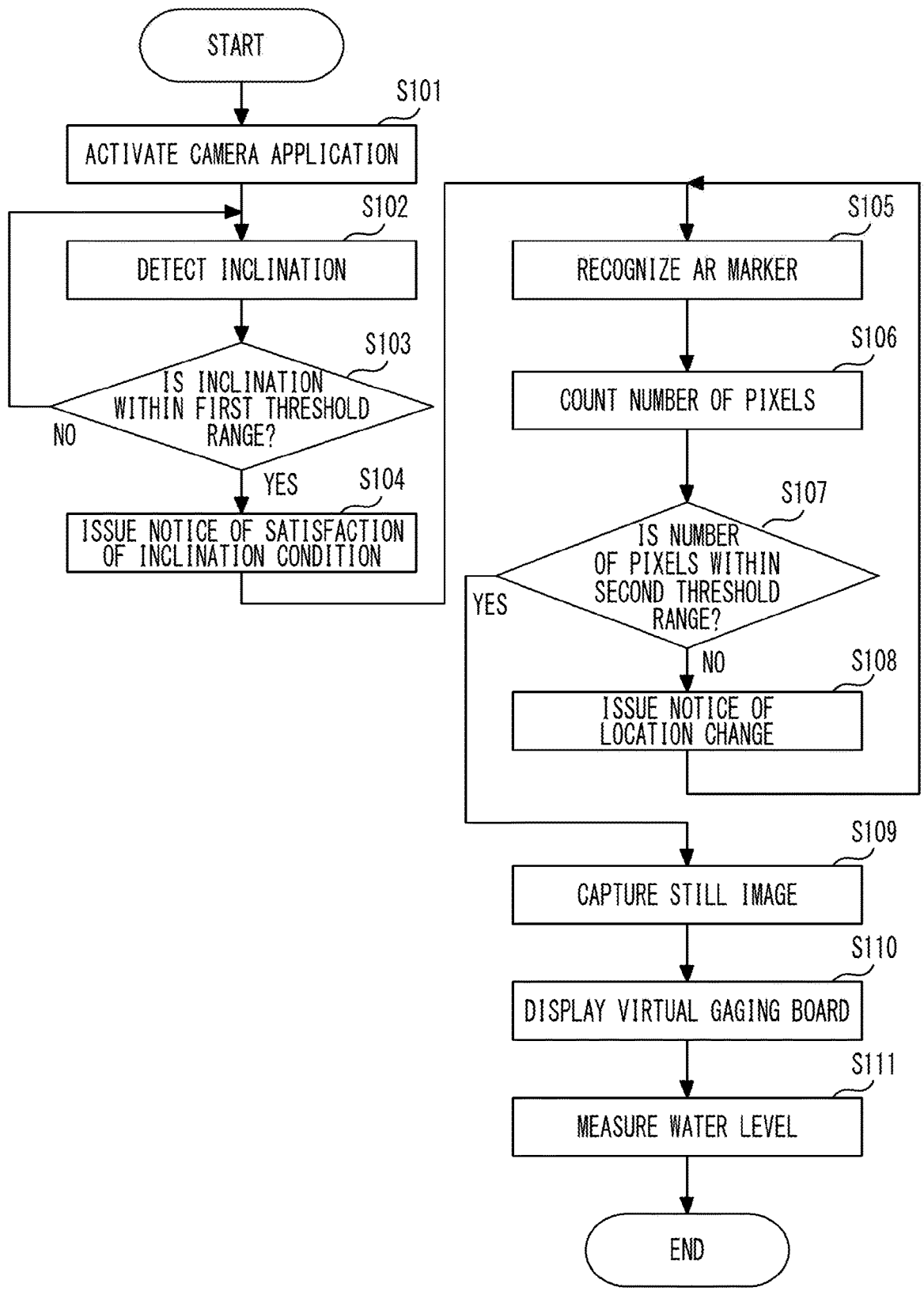
FIG. 5 is a flowchart illustrating an example of the operation of the observation terminal.
Figure 6A:
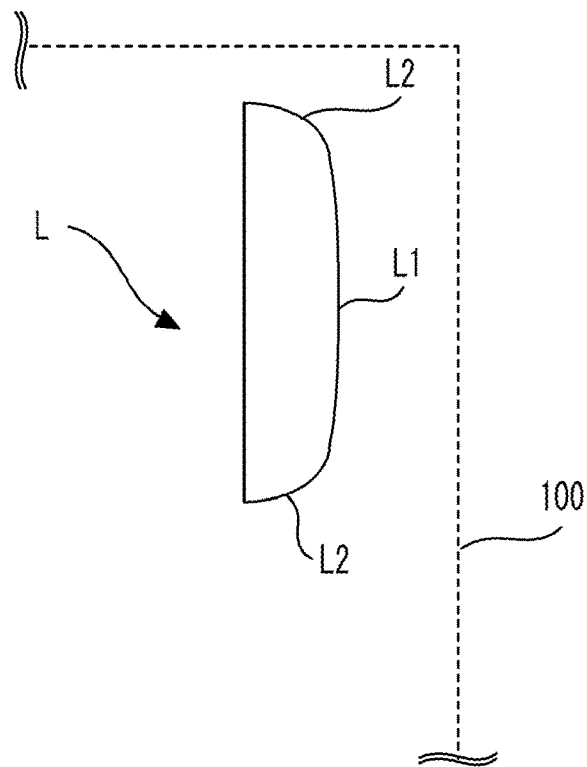
FIG. 6A is an exemplary side view of a lens in the observation terminal that is in an upright position.
Figure 6B:
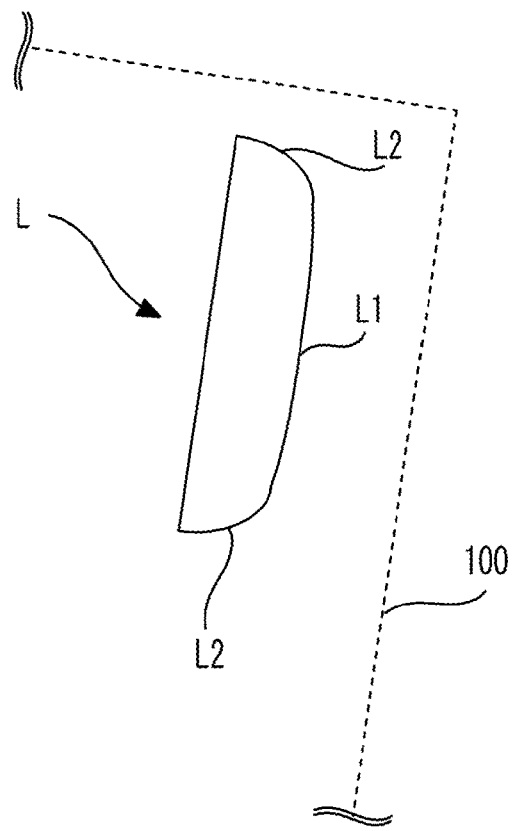
FIG. 6B is an exemplary side view of the lens in the observation terminal that is not in an upright position.
Figure 7:
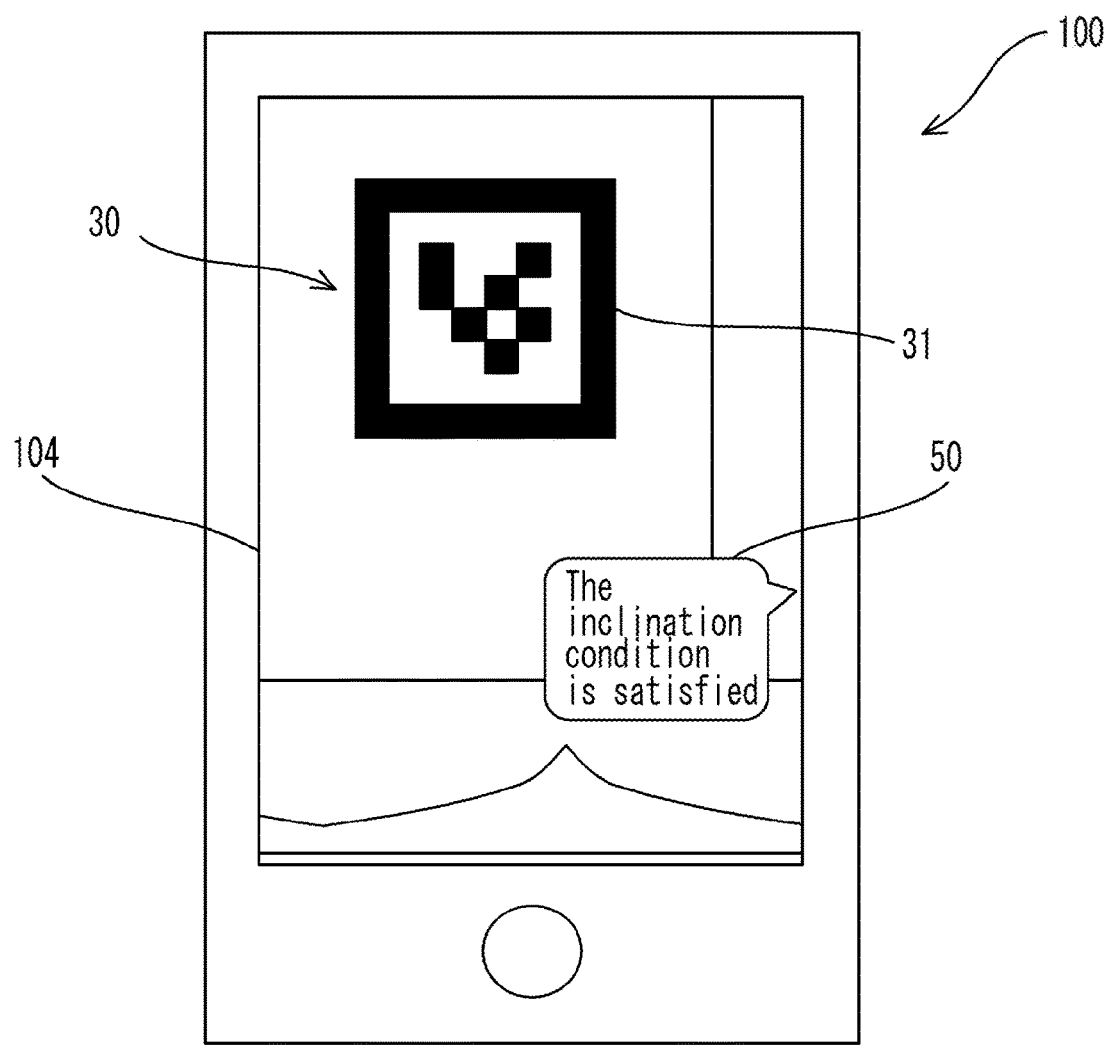
FIG. 7 is a diagram for describing an example of a first notice.
Figure 8A:
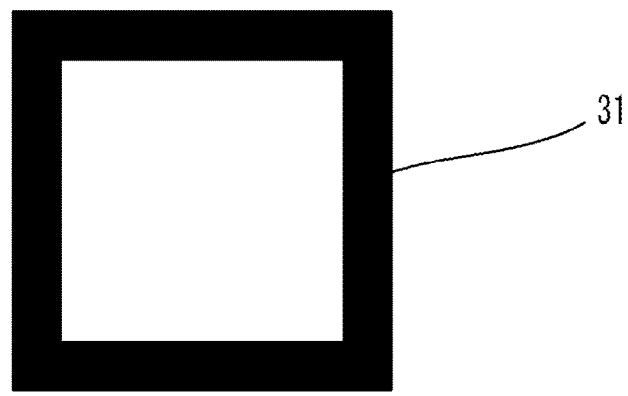
FIG. 8A is a diagram for describing an example of a rectangular frame region of an AR marker.
Figure 8B:
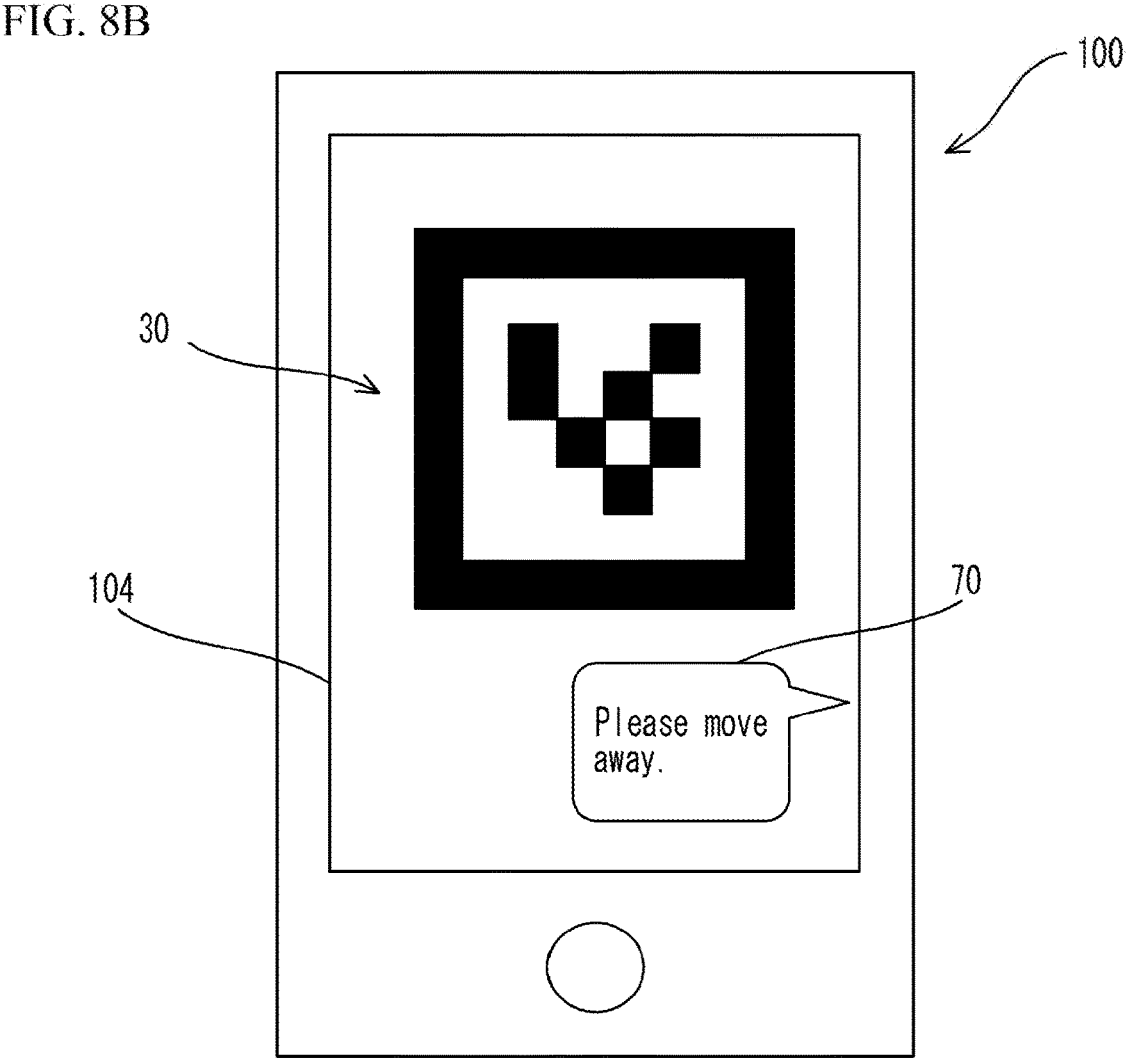
FIG. 8B is a diagram for describing a transference notice.
Figure 9A:
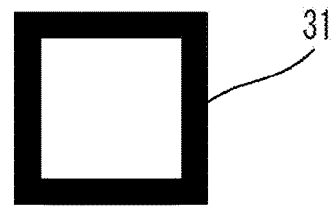
FIG. 9A is a diagram for describing another example of the rectangular frame region of the AR marker.
Figure 9B:
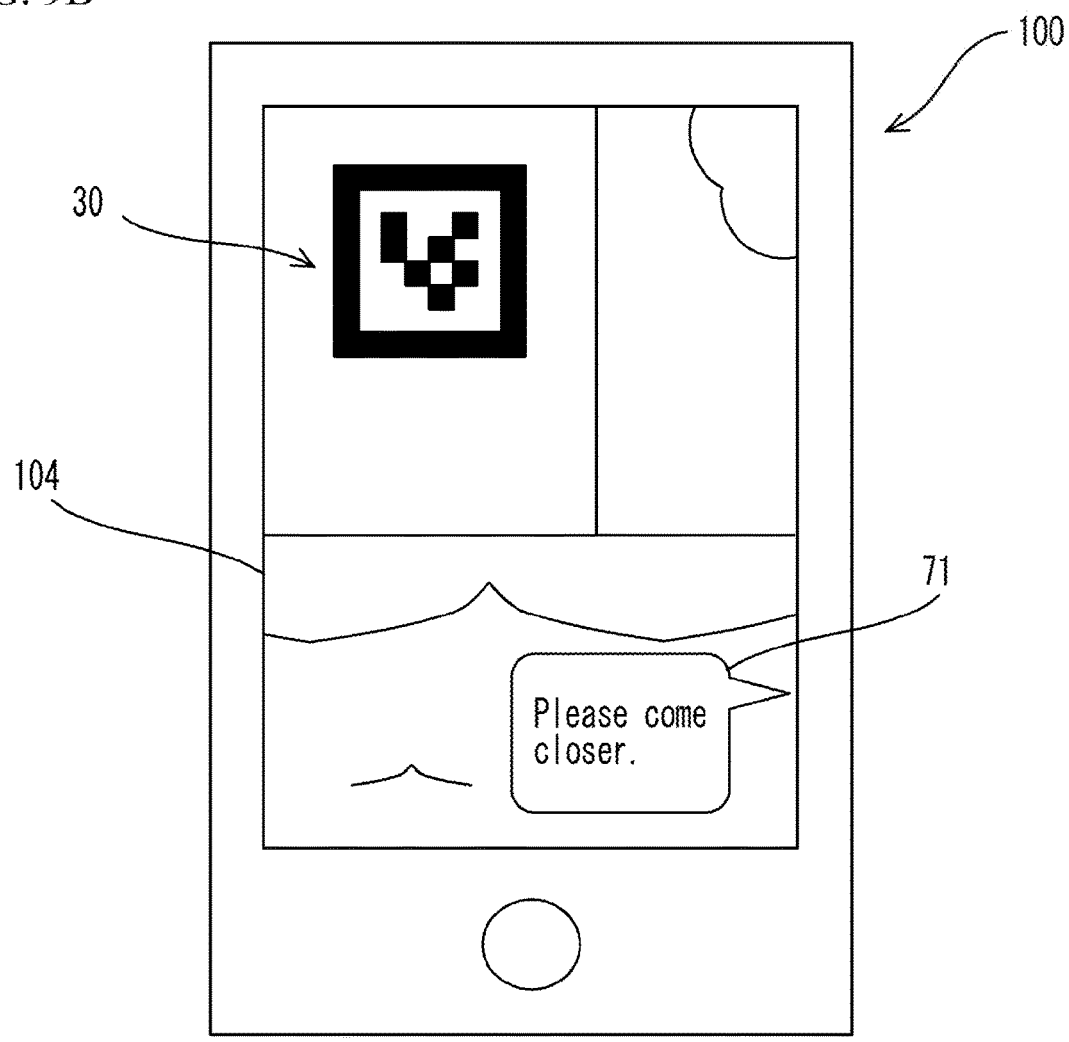
FIG. 9B is a diagram for describing another transference notice.
Figure 10:
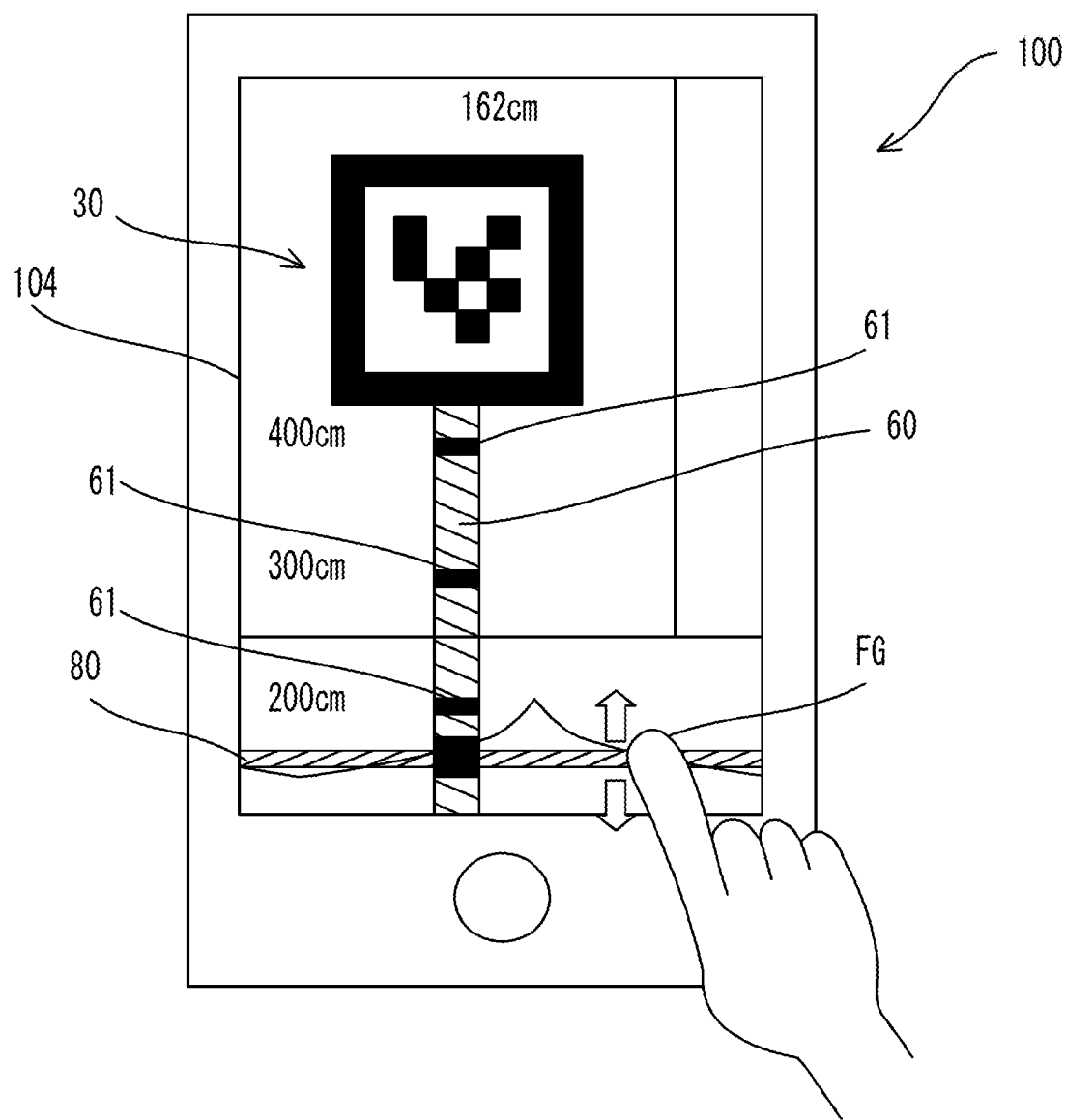
FIG. 10 is a display example of a virtual gaging board and an example of the operation conducted when the water level of a river is measured.

FIG. 5 is a flowchart illustrating the example of the operation of the observation terminal 100. FIG. 6A is an exemplary side view of a lens L in the observation terminal 100 that is in an upright position. FIG. 6B is an exemplary side view of the lens L in the observation terminal 100 that is not in an upright position. FIG. 7 is a diagram for describing an example of a first notice 50. FIG. 8A is a diagram for describing an example of a rectangular frame region 31 of the AR marker 30. FIG. 8B is a diagram for describing a transference notice 70. FIG. 9A is a diagram for describing another example of the rectangular frame region 31 of the AR marker 30. FIG. 9B is a diagram for describing another transference notice 71. FIG. 10 illustrates a display example of a virtual gaging board 60 and an example of an operation conducted when the water level of the river 20 is measured. The lens L is included in the camera 100G as described above.

As illustrated in FIG. 5, the control unit 106 activates a camera application (step S101). More specifically, when the observer 10 taps, with a finger, a button for activating the camera application arranged on a predetermined screen (e.g., a home screen) displayed on the display unit 104, the input unit 103 receives the input corresponding to this operation, and outputs the received input to the control unit 106. This causes the control unit 106 to activate the camera application, and output, to the display unit 104, the captured image output from the imaging unit 102. That is, the control unit 106 shifts into an imaging mode. As a result, the captured image corresponding to the imaging region 40 appears on the display unit 104 (see FIG. 2).

On completion of the process at step S101, the control unit 106 then detects the inclination of the observation terminal 100 (step S102). More specifically, the control unit 106 detects the inclination of the observation terminal 100 based on the gravitational acceleration output from the measuring unit 101. On completion of the process at step S102, the control unit 106 determines whether the detected inclination is within a first threshold range (step S103). The first threshold range is a threshold range used to determine whether the inclination of the observation terminal 100 is within a predetermined inclination range. A range between single-digit positive and negative degrees, such as a range of ±3 degrees, to the direction perpendicular to the ground is set as the first threshold range. When the control unit 106 determines that the detected inclination is not within the first threshold range (step S103: NO), the control unit 106 determines that the observation terminal 100 is not in an upright position, and executes the process at step S102 again. That is, the control unit 106 continues to detect the inclination of the observation terminal 100 until the control unit 106 determines that the detected inclination is within the first threshold range. The control unit 106 determines whether the observation terminal 100 is in an upright position based on the above-described processes.

As described above, when the observation terminal 100 is in an upright position, as illustrated in FIG. 6A, the imaging unit 102 can capture an image in the imaging region 40 through the center portion L1 of the lens L. The center portion L1 has a small curvature, thus having low non-linearity. Thus, in the captured image generated based on the imaging region 40 by the imaging unit 102, the distortion is little even in the peripheral portion. However, when the observation terminal 100 is not in an upright position, and is inclined at the angle outside the first threshold range, as illustrated in FIG. 6B, the imaging unit 102 captures an image in the imaging region 40 through the end portion L2 (for example, the upper end portion located at the upper end of the end portion L2) of the lens L. The end portion L2 has a large curvature, thus having high non-linearity. Thus, in the captured image generated based on the imaging region 40 by the imaging unit 102, the distortion increases at closer distances to the peripheral portion.

Thus, if the water level of the river 20 is measured by applying the virtual gaging board 60 (see FIG. 10), which is marked with scale marks and generated under the assumption that the peripheral portion of the captured image or still image is not distorted, to the captured image of which the peripheral portion is distorted, measurement errors of the water level may occur. Therefore, in the present embodiment, to avoid such measurement errors, when the control unit 106 determines that the observation terminal 100 is in an upright position, the control unit 106 executes subsequent processes.

When the control unit 106 determines that the detected inclination is within the first threshold range (step S103: YES), the control unit 106 issues a notice of satisfaction of an inclination condition (step S104). Preferably, when the control unit 106 determines that the detected inclination is within the first threshold range, and determines that the time during which the detected inclination is within the first threshold range is equal to or greater than a predetermined time (e.g., several seconds), the control unit 106 issues a notice of satisfaction of the inclination condition. As a result, on the display unit 104 of the observation terminal 100, the first notice 50, which notifies the observer 10 of the satisfaction of the inclination condition, appears superimposed on the captured image, as illustrated in FIG. 7. The control unit 106 may not necessarily execute the process at step S104, and may skip the process at step S104.

On completion of the process at step S104, the control unit 106 recognizes the AR marker 30 (step S105), and counts the number of pixels (step S106). More specifically, when the control unit 106 recognizes the AR marker 30 in the captured image, the control unit 106 counts the number of pixels of the rectangular frame region 31 (see FIG. 7) of the AR marker 30 contained in the captured image in the display unit 104. The rectangular frame region 31 of the AR marker 30 can be identified based on the AR technology. Since the rectangular frame region 31 is expressed by black, it is sufficient if the control unit 106 counts the number of black pixels representing the rectangular frame region 31. The pixel may be referred to as a dot or a picture element.

On completion of the process at step S106, the control unit 106 determines whether the counted number of pixels is within a second threshold range (step S107). The second threshold range is a range used to determine, based on the number of pixels, whether the distance between the observation terminal 100 and the AR marker 30 is within a predetermined range. The range of the number of pixels defined by a lower limit threshold value and an upper limit threshold value, such as a range from 340 pixels to 360 pixels, is set as the second threshold range. When the control unit 106 determines that the counted number of pixels is not within the second threshold range (step S107: NO), the control unit 106 issues a notice of location change (step S108), and executes the process at step S105 again.

For example, when the counted number of pixels is 400 pixels, which is not within the aforementioned second threshold range, as illustrated in FIG. 8A, the control unit 106 issues a notice of location change to the observer 10. In particular, when the counted number of pixels is greater than the upper limit threshold value of the second threshold range, it is expected that the observation terminal 100 is too close to the AR marker 30 when the image of the AR marker 30 is captured. In this case, the upper end portion located at the upper end of the end portion L2 of the lens L captures the AR marker 30, while the lower end portion located at the lower end of the end portion L2 of the lens L captures the water surface of the river 20. Accordingly, the AR marker 30 is displayed closer to the upper end of the screen of the observation terminal 100, and the water surface of the river 20 is displayed closer to the lower end. However, since the end portion L2, which has high non-linearity, of the lens L is used, the distortion of the AR marker 30 and the distortion of the water surface of the river 20 displayed on the screen are large, and the measurement error may thereby increase. Thus, the control unit 106 issues a notice that recommends the observer 10 to move to the location further away from the AR marker 30. Accordingly, as illustrated in FIG. 8B, on the display unit 104 of the observation terminal 100, the transference notice 70 that recommends the observer 10 to move to the location further away from the AR marker 30 is displayed superimposed on the captured image.

On the other hand, when the counted number of pixels is 300 pixels, which is not within the aforementioned second threshold range either, as illustrated in FIG. 9A, the control unit 106 issues a notice of location change to the observer 10. In particular, when the counted number of pixels is less than the lower limit threshold value of the second threshold range, it is expected that the observation terminal 100 is too far from the AR marker 30 when the image of the AR marker 30 is captured. In this case, the center portion L1 of the lens L captures the AR marker 30 and the water surface of the river 20. Thus, the AR marker 30 and the water surface of the river 20 are displayed near the center of the screen of the observation terminal 100. Since the center portion L1, which has low non-linearity, of the lens L is used, the distortion of the AR marker 30 and the distortion of the water surface of the river 20 displayed in the screen are small, and the measurement error is thus decreased. However, since the AR marker 30 and the water surface of the river 20 are displayed small on the screen of the observation terminal 100, the resolution of the water surface becomes low, or it becomes severe to determine the position of a measurement bar 80 (see FIG. 10) with a finger FG described later. Therefore, the measurement error may increase. Thus, the control unit 106 issues a notice that recommends the observer 10 to move to the location closer to the AR marker 30. As a result, as illustrated in FIG. 9B, on the display unit 104 of the observation terminal 100, another transference notice 71 that recommends the observer 10 to move to the location closer to the AR marker 30 is displayed superimposed on the captured image.

On the other hand, when the control unit 106 determines that the counted number of pixels is within the second threshold range (step S107: YES), the control unit 106 captures a still image (step S109). That is, when the counted number of pixels is within the second threshold range, the control unit 106 dynamically captures a still image. The control unit 106 may reactivate the imaging unit 102 to capture a still image, or may generate a still image based on the captured image output from the imaging unit 102 immediately after the determination with the second threshold range.

On completion of the process at step S109, the control unit 106 displays the virtual gaging board 60 (step S110), and measures the water level of the river 20 (step S111). More specifically, the control unit 106 analyzes the AR marker 30, displays the virtual gaging board 60 associated with the AR marker 30 on the display unit 104, and fixes the screen in which the still image is displayed. As a result, as illustrated in FIG. 10, the virtual gaging board 60 extending from the center of the lower end of the AR marker 30 to the lower side of the screen appears. The virtual gaging board 60 is marked with scale marks 61 at predetermined intervals (more specifically, at 100 cm intervals).

In addition, as illustrated in FIG. 10, when the screen is touched by the finger FG of the observer 10, the control unit 106 receives the input corresponding to the touch output from the input unit 103, and displays the measurement bar 80 extending to the right and left from the touched position of the screen on the display unit 104. When the observer 10 slides the finger FG in the vertical direction while maintaining the screen touched with the finger FG, the control unit 106 receives the input corresponding to the operation from the input unit 103, and moves the measurement bar 80 in accordance with the movement of the finger FG while maintaining the display of the measurement bar 80. At this time, the control unit 106 measures the water level specified by the scale mark 61 of the virtual gaging board 60 in accordance with the movement of the measurement bar 80, and displays the measured water level in the upper portion of the screen. In the present embodiment, the control unit 106 measures the water level of 162 cm, and displays the measured water level.

The observer 10 adjusts the position of the measurement bar 80 to the water surface of the river 20 contained in the still image through the above-described operations. Then, when the finger FG of the observer 10 is removed from the screen and is not in contact with the screen, the control unit 106 confirms the measured water level. When the control unit 106 confirms the measured water level, the control unit 106 outputs, to the communication unit 105, the river information including the confirmed water level and the still image. This causes the communication unit 105 to transmit the river information to the management server 200. The control unit 106 may output the river information including the current date and time and a comment input by the observer 10 in addition to the confirmed water level and the still image.

As described above, in the first embodiment, the observation terminal 100 includes the control unit 106. The control unit 106 detects the inclination of the observation terminal 100. When the control unit 106 detects that the inclination of the observation terminal 100 is within a predetermined inclination range and the number of pixels corresponding to the AR marker 30 contained in a captured image is within a predetermined range, the control unit 106 captures a still image. As described above, since the control unit 106 captures a still image when the inclination of the observation terminal 100 is within the predetermined inclination range, the image of the imaging region 40 as an imaging subject can be precisely captured. As a result, the control unit 106 can receive the captured image of which the peripheral portion is not distorted, and output the captured image to the display unit 104. That is, since the distortion of the peripheral portion of the captured image that occurs when the attitude of the observation terminal 100 is inclined is resolved, the measurement accuracy of the water level of the river 20 by the observer 10 is increased.

In addition, since the control unit 106 captures a still image when detecting that the number of pixels corresponding to the AR marker 30 contained in the captured image is within the predetermined range, the increase in measurement error due to the aforementioned reasons is avoided.

Second Embodiment

Figure 11:
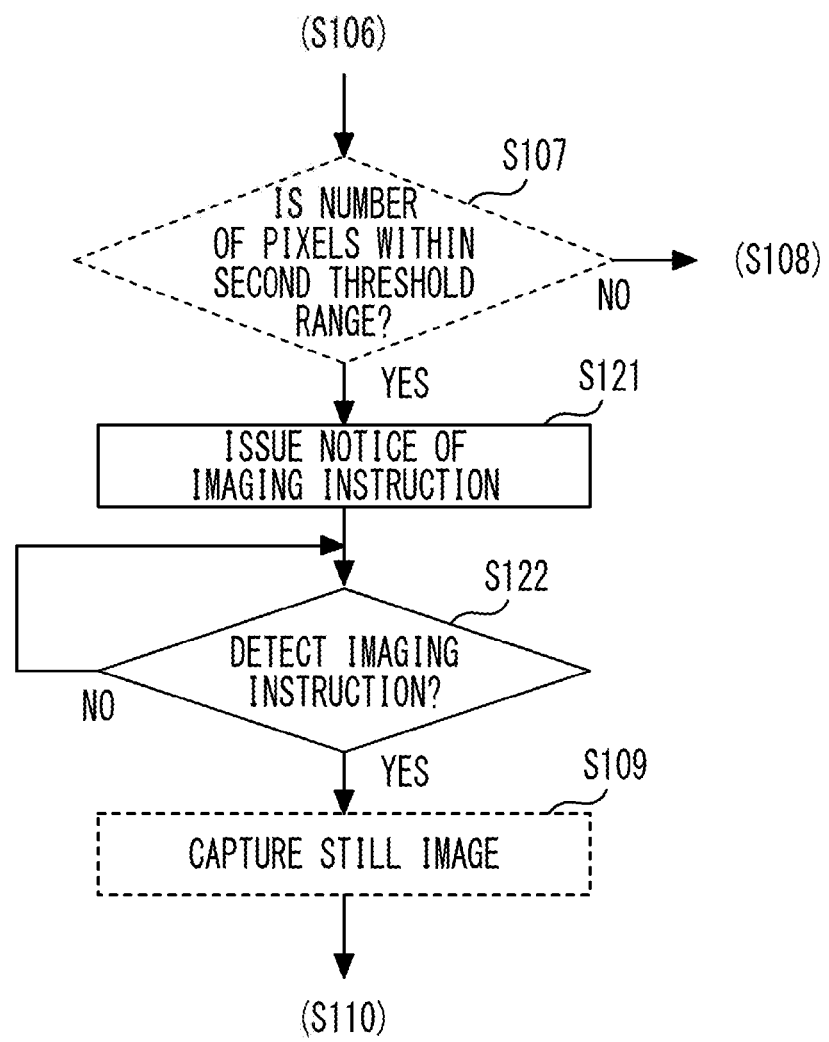
FIG. 11 is a flowchart illustrating part of the operation of the observation terminal.
Figure 12:
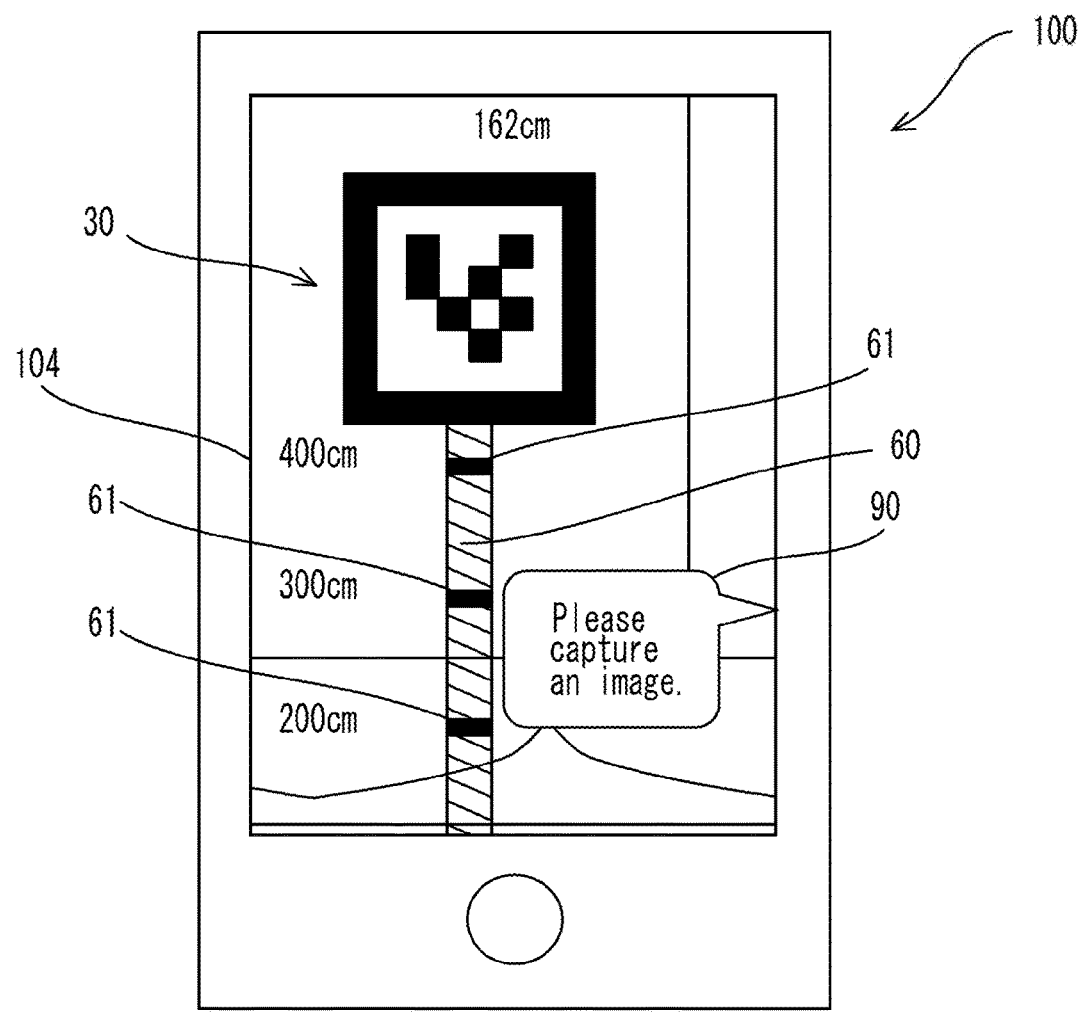
FIG. 12 illustrates an example of a second notice.

Next, with reference to FIG. 11 and FIG. 12, a second embodiment of the present case will be described. FIG. 11 is a flowchart illustrating part of the operation of the observation terminal 100. FIG. 12 is an example of a second notice 90. As illustrated in FIG. 11, in the process at step S107 described in the first embodiment (see FIG. 5), when determining that the counted number of pixels is within the second threshold range, the control unit 106 issues a notice of an imaging instruction (step S121). As a result, as illustrated in FIG. 12, on the display unit 104 of the observation terminal 100, the second notice 90, which instructs the observer 10 to capture a still image, appears superimposed on the captured image.

On completion of the process at step S121, the control unit 106 waits until the control unit 106 detects the imaging instruction (step S122: NO). Then, when the control unit 106 detects the imaging instruction (step S122: YES), the control unit 106 executes the process at step S109. For example, when the finger FG of the observer 10 touches the second notice 90, the control unit 106 detects the imaging instruction through the input unit 103, and captures a still image by executing the process at step S109. Alternatively, when the finger FG of the observer 10 touches a particular image appearing in a different area from the second notice 90, the control unit 106 may detect the imaging instruction through the input unit 103, and execute the process at step S109.

As described above, in the second embodiment, when the control unit 106 detects that the inclination of the observation terminal 100 is within the predetermined inclination range and the number of pixels corresponding to the AR marker 30 contained in the captured image is within the predetermined range, the control unit 106 issues a notice of the imaging instruction. Accordingly, the observer 10 can measure the water level of the river 20 after checking the imaging region 40 to be captured as a still image.

Third Embodiment

Figure 13:
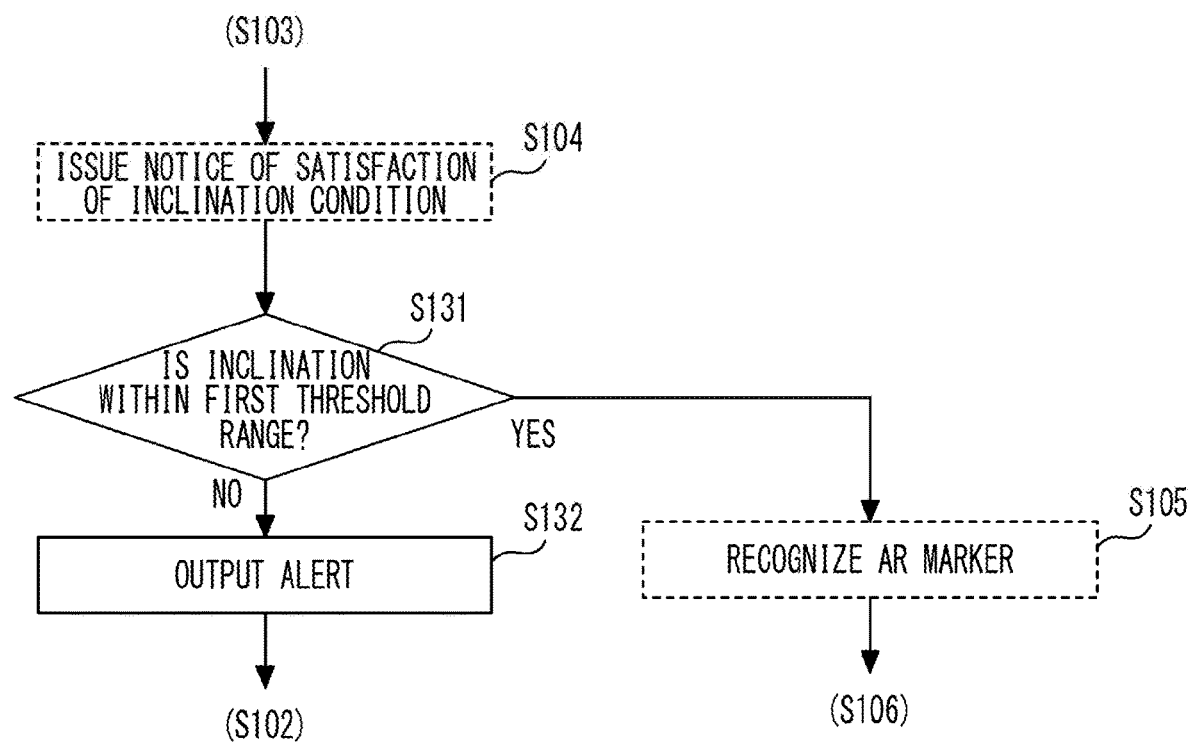
FIG. 13 is a flowchart illustrating part of the operation of the observation terminal.
Figure 14:
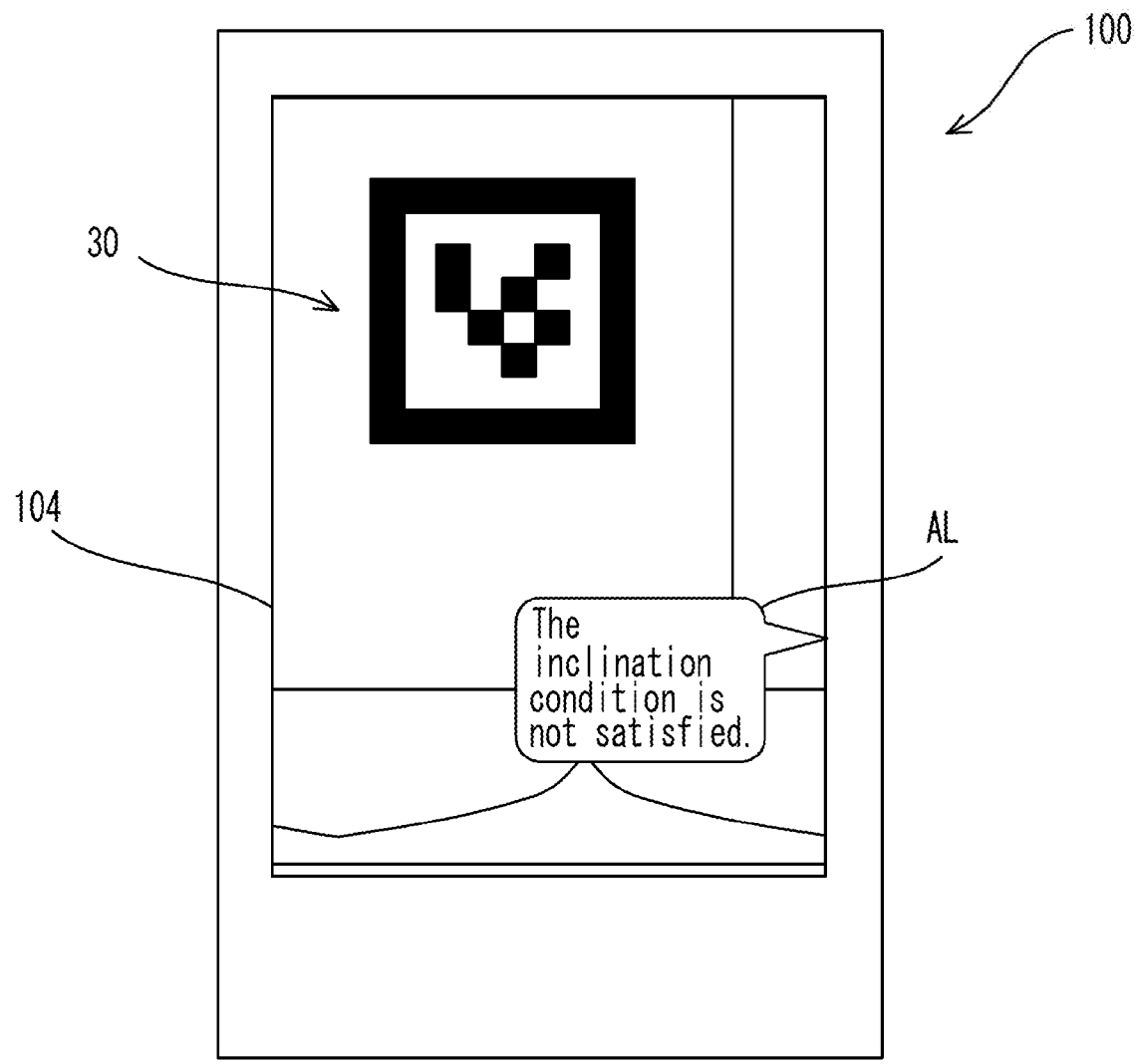
FIG. 14 is an example of an alert.

Next, with reference to FIG. 13 and FIG. 14, a third embodiment of the present case will be described. FIG. 13 is a flowchart illustrating part of the operation of the observation terminal 100. FIG. 14 illustrates an example of an alert AL. As illustrated in FIG. 13, after the process at step S104 described in the first embodiment (see FIG. 5), the control unit 106 determines whether the inclination is within the first threshold range (step S131). That is, after issuing a notice of satisfaction of the inclination condition, the control unit 106 determines whether the inclination is within the first threshold range again.

When determining that the inclination is within the first threshold range (step S131: YES), the control unit 106 executes the process at step S105. That is, the control unit 106 recognizes the AR marker 30. On the other hand, when determining that the inclination is not within the first threshold range (step S131: NO), i.e, determining that the inclination is out of the first threshold range, the control unit 106 outputs an alert (step S132). As a result, as illustrated in FIG. 14, on the display unit 104 of the observation terminal 100, the alert AL, which notifies the observer 10 that the inclination condition is not met, appears superimposed on the captured image.

As described above, in the third embodiment, when the inclination of the observation terminal 100 falls outside the first threshold range after a notice of satisfaction of the inclination condition was issued, the control unit 106 outputs the alert AL. Thus, the observer 10 returns the inclination of the observation terminal 100 to the upright position. Accordingly, the water level of the river 20 is inhibited from being measured based on the distorted captured image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

For example, the control unit 106 may expand the first threshold range when the time during which the inclination of the observation terminal 100 is not within the first threshold range exceeds a predetermined time, and may issue a notice of satisfaction of the inclination condition and/or a notice of the imaging instruction based on the expanded first threshold range. For example, when the first threshold range is expanded from a range of ±3 degrees to a range of ±5 degrees, the observation terminal 100 tends to be determined to be in an upright position, and the time to the water level measurement is reduced.

In addition, for example, the control unit 106 may expand the second threshold range when the time during which the number of pixels of the rectangular frame region 31 corresponding to the AR marker 30 contained in the captured image is not within the second threshold range exceeds a predetermined time after a notice of satisfaction of the inclination condition was issued, and may issue a notice of the imaging instruction based on the expanded second threshold range. When the second threshold range expands from, for example, a range of 340 to 360 pixels to a range of 300 to 400 pixels, a notice of location change is not easily issued, and the time to the water level measurement is reduced.

In addition, for example, when the control unit 106 determines that both the AR marker 30 and the water surface of the river 20 are contained in the captured image after determining that the number of pixels is within the second threshold range, the control unit 106 may capture a still image. This configuration inhibits the water level of the river 20 from not being measured. The control unit 106 may determine whether the water surface of the river 20 is contained in the captured image based on the predetermined color corresponding to the river 20, or may determine, as the water surface of the river 20, the part in which the difference between the color of the river bank and the color of the river 20 is equal to or greater than a threshold value.

What is claimed is:

1. A non-transitory computer-readable storage medium storing an imaging processing program that causes a computer to execute a process, the process comprising:
   detecting an inclination of a terminal that is in an imaging mode;
   issuing a first notice when the inclination of the terminal falls within a predetermined inclination range; and
   issuing a second notice or capturing a still image when the inclination of the terminal is within the predetermined inclination range and a number of pixels corresponding to a reference subject contained in a captured image falls within a predetermined range, wherein the process further comprising:
      expanding the predetermined inclination range when a time during which the inclination of the terminal is not within the predetermined inclination range exceeds the predetermined time, and
      issue the first notice and/or issue the second notice based on the predetermined inclination range that has been expanded.

2. The non-transitory computer-readable storage medium according to claim 1, wherein the process further comprises outputting an alert regarding inclination when the inclination of the terminal falls outside the predetermined inclination range after issue of the first notice.

3. The non-transitory computer-readable storage medium according to claim 1, wherein the second notice is a notice that instructs to capture a still image.

4. A non-transitory computer-readable storage medium storing an imaging processing program that causes a computer to execute a process, the process comprising:
   detecting an inclination of a terminal that is in an imaging mode;
   issuing a first notice when the inclination of the terminal falls within a predetermined inclination range; and
   issuing a second notice or capturing at still image when the inclination of the terminal is within the predetermined inclination range and a number of pixels corresponding to a reference subject contained in a captured image falls within a predetermined range;
   expanding the predetermined range for the number of pixels when a time during which the number of pixels corresponding to the reference subject contained in the captured image is not within the predetermined range exceeds a predetermined time after issue of the first notice; and
   issuing the second notice based on the predetermined range that has been expanded.

5. The non-transitory computer-readable storage medium according to claim 1, wherein the process further comprises issuing a third notice when the number of pixels corresponding to the reference subject contained in the captured image does not fall within the predetermined range after issue of the first notice.

6. The non-transitory computer-readable storage medium according to claim 5, wherein the third notice is a notice that instructs to change a location from which an image is captured.

7. A non-transitory computer-readable storage medium storing an imaging processing program that causes a computer to execute a process, the process comprising:
   detecting an inclination of a terminal that is in a imaging mode;
   issuing a first notice when the inclination of the terminal falls within a predetermined inclination range;
   issuing a second notice or capturing a still image when the inclination of the terminal is within the predetermined inclination range and a number of pixels corresponding to a reference subject contained in a captured image falls within a predetermined range; and
   displaying an image content, which is preliminarily generated based on a still image without distortion, superimposed on the captured image in association with the reference subject after issue of the first notice, and conducting measurement with use of a relationship between the image content and the captured image when detecting a touch to the captured image.

8. An imaging processing method implemented by a computer, the imaging processing method comprising:
   detecting an inclination of the imaging processing device that is in an imaging mode;
   issuing a first notice when the inclination of the imaging processing device falls within a predetermined inclination range; and
   issuing a second notice or capturing a still image when the inclination of the imaging processing device is within the predetermined inclination range and a number of pixels corresponding to a reference subject contained in a captured image falls within a predetermined range, wherein the image processing method further comprises:
      expanding the predetermined inclination range when a time during which the inclination of the image processing device is not within the predetermined inclination range exceeds the predetermined time, and
      issue the first notice and/or issue the second notice based on the predetermined inclination range that has been expanded.

9. An imaging processing device comprising:
   a memory; and
   a processor coupled to the memory and configured to:
      detect an inclination of the imaging processing device that is in an imaging mode,
      issue a first notice when the inclination of the imaging processing device falls within a predetermined inclination range, and
      issue a second notice or capture a still image when the inclination of the imaging processing device is within the predetermined inclination range and a number of pixels corresponding to a reference subject contained in a captured image falls within a predetermined range, wherein
   the processor is further configured to:

expand the predetermined inclination range when a time during which the inclination of the imaging processing device is not within the predetermined inclination range exceeds a predetermined time, and issue the first notice and/or issue the second notice based on the predetermined inclination range that has been expanded.

10. The imaging processing device according to claim 9, wherein the processor is further configured to output an alert regarding inclination when the inclination of the imaging processing device falls outside the predetermined inclination range after issue of the first notice.

11. An imaging processing device comprising:

a memory; and a processor coupled to the memory and configured to:

detect an inclination of the imaging processing device that is in an imaging mode, issue a first notice when the inclination of the imaging processing device falls within a predetermined inclination range, and issue a second notice or capture a still image when the inclination of the imaging processing device is within the predetermined inclination range and a number of pixels corresponding to a reference subject contained in a captured image falls within a predetermined range, wherein the processor is further configured to:

expand the predetermined range for the number of pixels when a time during which the number of pixels corresponding to the reference subject contained in the captured image is not within the predetermined range exceeds a predetermined time after issue of the first notice, and issue the second notice based on the predetermined range that has been expanded.

12. The imaging processing device according to claim 9, wherein the processor is further configured to issue a third notice when the number of pixels corresponding to the reference subject contained in the captured image does not fall within the predetermined range after issue of the first notice.

13. An imaging processing device comprising:

a memory; and a processor coupled to the memory and configured to:

detect an inclination of the imaging processing device that is in an imaging mode, issue a first notice when the inclination of the imaging processing device falls within a predetermined inclination range, and issue a second notice or capture a still image when the inclination of the imaging processing device is within the predetermined inclination range and a number of pixels corresponding to a reference subject contained in a captured image falls within a predetermined range, wherein the processor is further configured to display an image content, which is preliminarily generated based on a still image without distortion, superimposed on the captured image in association with the reference subject after issue of the first notice, and conduct measurement with use of a relationship between the image content and the captured image when detecting a touch to the captured image.

* * * * *